United States Patent Office 2,759,137
Patented Aug. 14, 1956

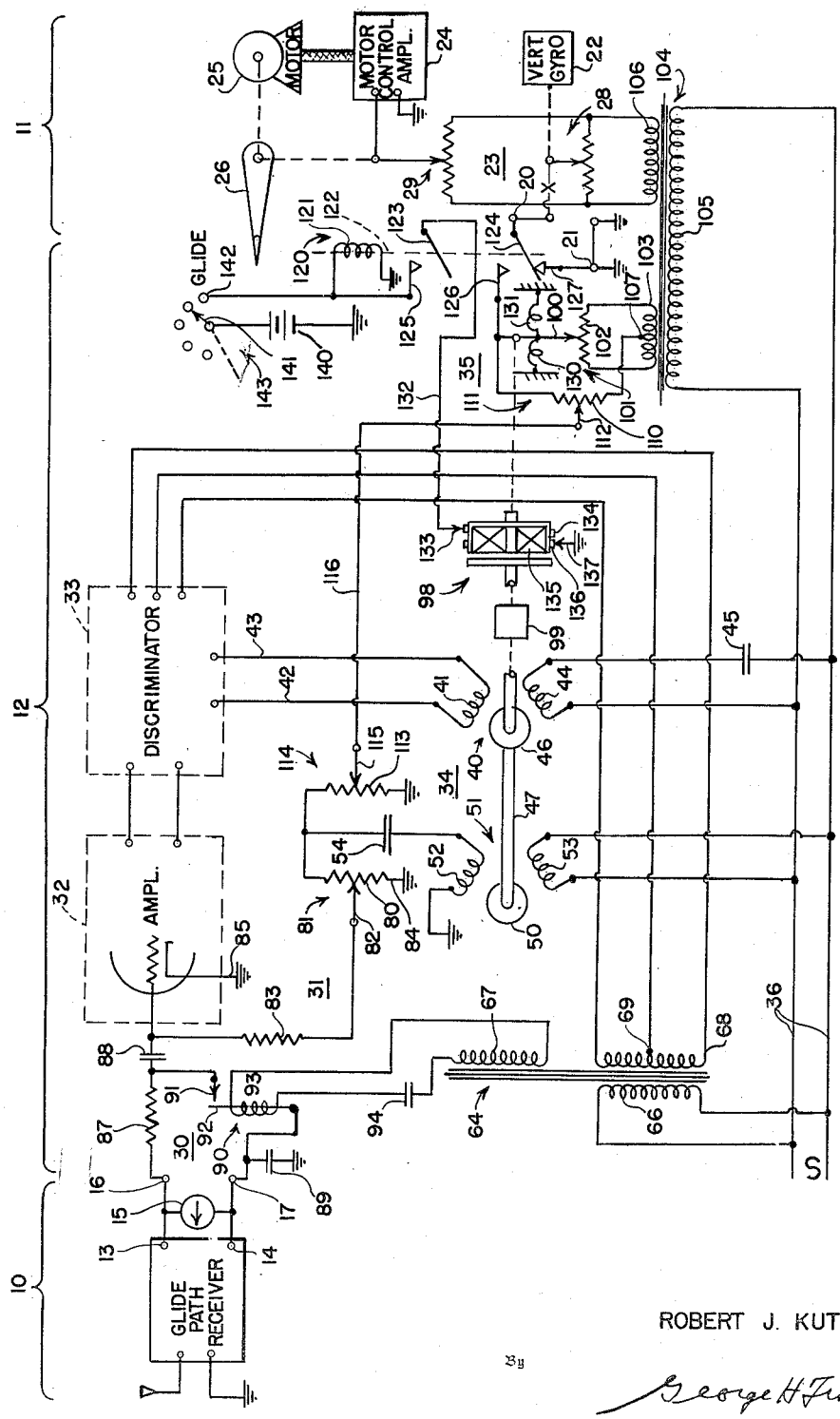

2,759,137

RADIO ACTUATED AIRCRAFT APPARATUS WITH RAPID RESPONSE AND INTEGRAL CONTROL

Robert J. Kutzler, Minneapolis, Minn., assignor to Minneapolis-Honeywell Regulator Company, Minneapolis, Minn., a corporation of Delaware Application February 27, 1950, Serial No. 146,490

7 Claims. (Cl. 318—489)

This invention relates to the field of aircraft control, and more particularly to apparatus for causing an aircraft to follow a path established in space by radio means, such for example as the glide path of the instrument landing system. Such apparatus is not broadly new, and it is a basic object of the invention to provide an improved component therefor in which the response to departure from the desired path is more satisfactory.

A more limited object of the invention is to provide such a component in which delay, between sensed change in the position of the craft and appearance of a control signal related thereto, is greatly reduced.

A further object of the invention is to provide such a system in which the control signal determined by the displacement of the craft from the desired path is derived from a generator.

Another object of the invention is to provide condition control apparatus in which a single power unit supplies not only a first controlling effect determined by the error in the condition but a second controlling effect determined both by the magnitude of the error and by the length of the interval during which it has persisted.

Another object of the invention is to provide control apparatus in which a controlling motor is operated at a rate determined by the error in a condition, and in which controlling outputs are provided which vary in accordance with the speed of the motor and with its total rotation.

A more detailed object of the invention is to provide control apparatus in which a first signal determined by the error in a condition is balanced by a second signal from a generator driven by a motor, and in which a control signal is provided which is made up in part by a signal from the generator and in part by a signal varying with the amount of operation of the motor.

Yet another object of the invention is to provide, in such an apparatus, resilient means insuring that the integral portion of the control signal is initially zero when the apparatus is about to be put into service.

Various other objects, advantages, and features of novelty which characterize the invention are pointed out with particularly in the claims annexed hereto and forming a part hereof. However, for a better understanding of the invention, its advantages, and objects attained by its use, reference should be had to the subjoined drawing, which forms a further part hereof, and to the accompanying descriptive matter, in which there is illustrated and described a preferred embodiment of the invention.

The single figure of the drawing is a wiring diagram schematically illustrating the airborne components of an instrument landing apparatus according to the invention, but it will of course be realized that the invention might equally well be applied to means for controlling the craft in response to some other form of radio signal. The invention is shown as embodied in the glide path portion of the complete instrument landing system; to avoid confusion the conventional localizer receiver and aileron and rudder channel of the automatic pilot have been omitted.

The principal components of the invention include a glide path receiver 10 which is connected in controlling relation to an automatic pilot 11 by a coupling unit 12. Receiver 10 is a standard unit of the well-known instrument landing system which is described in Technical Development Reports No. 35 and No. 36 of the Civil Aeronautics Authority, entitled "The CAA–RTCA Instrument Landing System" and published in October 1943. The receiver supplies at a pair of output terminals 13 and 14 a unidirectional voltage whose magnitude and polarity depend upon the amount and direction of the displacement of the craft from a landing beam established in space by the radio transmitter of the ILS ground installation. This voltage is supplied to the horizontal needle of a cross-pointer indicator 15, and also to the input terminals 16 and 17 of coupling unit 12.

The coupling unit functions when the system is in operation, to supply at a pair of output terminals 20 and 21 a voltage, for controlling automatic pilot 11, which varies in amplitude and reverses in phase with variation in the magnitude and reversal in the polarity of unidirectional voltage applied to input terminals 16 and 17. A coupling unit for performing such a function is shown in the copending application of Alderson et al., Serial No. 49,442, filed September 15, 1943 and assigned to the assignee of the first application.

In the drawing, the elevator channel only of automatic pilot 11 is shown, and is seen to comprise a vertical gyroscope 22 which normally controls the balance condition of an elevator bridge 23 by adjusting a voltage divider 28. The output of the bridge is applied to a motor control amplifier 24 to control the energization of a servo-motor 25 which actuates the elevators 26 of the craft and also rebalances bridge 23 by adjusting a voltage divider 29. The elevator channel is continued between terminals 20 and 21 by portions of coupling unit 12, to add to the bridge signal a further signal whenever the craft deviates from the desired glide path. Since the automatic pilot is constructed for operation from a source of alternating voltage, the control voltage appearing at output terminals 20 and 21 of the coupling unit 12 must be an alternating voltage of the same frequency, and either of the same phase or 180 degrees out of phase therewith.

The functions to be accomplished in coupling unit 12 now having generally been made known, the structure by which these functions are accomplished will be described in detail. The principal components of coupling unit 12 include an input network 30 and a rebalancing network 31, which together energize an amplifier 32. The output of amplifier 32 controls the operation of a phase discriminator 33: this device supplies an alternating voltage output which is of one phase if the input to the discriminator is in phase with a standard voltage, and which is of the opposite phase if the input to the discriminator is of the opposite phase to the standard voltage. The output from discriminator 33 is supplied to a power unit 34, which adjusts the voltage supplied by rebalancing network 31, and also the voltage supplied at terminals 20 and 21 by an output network 35. Alternating voltage is supplied to coupling unit 12, and also to automatic pilot 11, on a pair of conductors indicated by the reference numeral 36.

Unit 34 comprises a reversible motor 40 energized from discriminator 33 whenever an output is supplied by amplifier 32. Motor 40 comprises an amplifier phase winding 41, connected to discriminator 33 by conductors 42 and 43 for energization with alternating voltage of reversible phase, and a line phase winding 44, energized in fixed phase relationship from conductors 36, through a quadrature capacitor 45. Windings 41 and 44 cooperate with a rotor 46 to cause rotation of a shaft 47 in one direction or the other depending on whether the energization of winding 41 leads or lags that of winding 44. The motor is of the type whose speed, for light loads such as are here present, varies directly with the energizing voltage, and to this end may be provided with a high resistance armature.

Discriminator 33 is energized with alternating voltage from conductors 36 through a secondary winding of a transformer 64, having a primary winding 66 connected to conductors 36 and a pair of secondary windings 67 and 68, the latter being center tapped at 69 and connected to discriminator 33.

Shaft 47 also carries the rotor 50 of a "velocity generator" having a secondary winding 52 and a primary winding 53, the latter being energized from conductors 36. Velocity generator 51 is so constructed that as long as rotor 50 is stationary, no voltage is induced in secondary winding 52 from primary winding 53, while if the rotor is in rotation a voltage is induced in secondary winding 52 which depends in phase on the direction of rotation of the rotor and in magnitude on the speed at which it is rotating. The output of velocity generator 51 is impressed through a phasing capacitor 54 across the winding 80 of a voltage divider 81 having a slider 82.

A grid circuit for amplifier 32 is shown to comprise a resistor 83, slider 82, the portion of winding 80 below the slider and ground connections 84 and 85. Resistor 83 prevents the grid of amplifier 32 from being directly grounded when slider 81 is at the bottom of winding 80, while permitting the grid to take a potential determined by the position of slider 82.

The potential of the grid of amplifier 32 is also affected by the voltage appearing at terminals 16 and 17, the former of which is connected to the grid through a resistor 87 and a coupling capacitor 88. Terminal 17 is isolated from the grounded cathode 85 of the amplifier input stage by a blocking capacitor 89, but the capacitor presents a relatively low impedance to alternating voltages of the frequency of that appearing on conductors 36.

The unidirectional voltage impressed on input terminals 16 and 17 is made effective upon the grid of amplifier 32 by means including a vibrator 90 having a fixed contact 91, a movable contact 92 and a coil 93. Coil 93 is energized from secondary winding 67 of transformer 64 through a phasing capacitor 94, and when energized causes movable contact 92 to oscillate first into and then out of engagement with fixed contact 91. When the two contacts are in engagement, the input to amplifier 32 is grounded: when the two contacts are out of engagement, the input signal is supplied to the grid of the amplifier. The input voltage for amplifier 32 is therefore essentially of square wave form, and the alternating component of this voltage is transmitted through capacitors 88 and 89 so that it appears across the input stage of amplifier 32. The amplitude of this component is determined by the magnitude of the unidirectional voltage appearing at terminals 16 and 17.

It is thus evident that the input to amplifier 32 comprises the sum of two alternating voltages, supplied by the input network and the rebalancing network. These voltages are of the same frequency, since vibrator 90 and velocity generator 51 are energized from secondary windings having the same primary excitation and phasing capacitor 94 is provided in the line energizing vibrator 90 for the purpose of insuring that the vibrator makes and breaks the connection between contacts 91 and 92 at the instant when the alternating voltage in secondary winding 52 is passing through zero. It is thus possible for the alternating component of the voltage supplied by vibrator 90 to be effectively neutralized by a voltage supplied by rebalancing network 31. This, however, would completely deenergize amplifier 32, and therefore cause motor 40 to stop rotating. What actually happens is that a condition of equilibrium is reached in which the input signal from vibrator 90 differs from the rebalancing signal from velocity generator 51 by just a sufficient amount to keep motor 40 in operation at a constant rate, for any constant value of input signal. The speed of operation of motor 40, and therefore the output voltage of velocity generator 51, are hence determined by the output from glide path receiver 10. It should be emphasized that the output voltage from the velocity generator has a distinct advantage over the output from a conventional rebalancing voltage supply, in that it takes its final value as soon as change in the input signal takes place, rather than requiring operation of the motor to adjust a voltage divider or some other mechanism to a new rebalancing position.

Shaft 47 is also extended, through reduction gearing 99 and through an electromagnet clutch 98, to operate the slider 100 of a voltage divider 101 having a winding 102 energized from a secondary winding 103 of a transformer 104 having a primary winding 105 energized from conductors 36 and a further secondary winding 106: secondary winding 103 is center tapped as at 107. As long as slider 100 is at the center of winding 102 it is at the same potential as center tap 107, but for all other positions of slider 100 a potential difference of reversible phase exists between the slider and the center tap, the phase being determined by the direction of the displacement of the slider: this potential difference is impressed across the winding 110 of a voltage divider 111 having a slider 112.

The output of velocity generator 51 is also impressed across the winding 113 of a voltage divider 114 having a slider 115, the latter being connected to slider 112 of voltage divider 111 by a conductor 116. An output circuit for the coupling unit may be traced from ground through the portion of winding 113 below slider 115 and the portion of winding 110 above slider 112. The output voltage of the coupling unit is therefore dependent, for any manual settings of sliders 112 and 115, upon the position of slider 100 and the speed of rotation of rotor 50.

Control of the elevators of the craft from the glide path receiver is not desired except during the final portion of an instrument landing: for all other conditions the output terminals are short circuited, and motor 40 is disconnected from slider 100, by operation of a relay 120. This relay includes a winding 121 which when energized actuates an armature 122 to move a pair of movable contacts 123 and 124 into engagement with a pair of fixed contacts 125 and 126 all respectively: when the relay is deenergized movable contact 124 falls back and engages a second fixed contact 127. Fixed contact 126 is electrically connected to slider 100 and to one end of winding 110, and slider 100 is normally maintained in the center of winding 102 by the action of springs 130 and 131. Movable contact 124 is connected to the slider of voltage divider 28, and fixed contact 127 is grounded.

Movable contact 123 of relay 120 is connected by a conductor 132, a brush 133, and a slip ring 134 to the winding 135 of electromagnetic clutch 98. The other end of the winding is connected through slip ring 136 and brush 137 to ground. Fixed contact 125 of relay 120 is energized from a source 140 of electrical energy through the movable contact 141 and a fixed contact 142 of a manually operated switch 143, when the latter is in its "Glide" position, and at the same time winding 121 of relay 120 is also energized. In all other positions of switch 143, winding 121 of relay 120 and winding 135 of clutch 98 are deenergized, and the slider of voltage divider 28 is grounded through movable contact 124 and fixed contact 127 of the relay.

It will be appreciated that the showing of automatic pilot 11 is extremely schematic, and that in practice this component of the invention would be considerably refined by the insertion at X, for example, of such further voltages as are considered desirable for most satisfactory operation of the apparatus.

The following values are suitable for use in the structure illustrated:

| | |
|---|---|
| Conductors 36 | 115 volts 400 cycles 1 phase. |
| Source 140 | 28 volts D. C. |
| Secondary winding 69 | 700 volts center tapped. |
| Secondary winding 67 | 6 volts. |
| Secondary winding 107 | 15 volts center tapped. |
| Secondary winding 106 | 40 volts. |
| Voltage divider 28 | 890 ohms. |
| Voltage divider 29 | 1600 ohms. |
| Voltage divider 81 and 114 | 2000 ohms. |
| Resistor 83 | 1 megohm. |
| Resistor 87 | 100,000 ohms. |
| Winding 102 | 500 ohms. |
| Winding 110 | 1000 ohms. |
| Capacitor 45 | .07 mfd. |
| Capacitor 54 | .23 mfd. |
| Capacitor 88 | .05 mfd. |
| Capacitor 89 | .05 mfd. |
| Capacitor 94 | .25 mfd. |

Operation

The normal operation of the automatic pilot will first be considered. When the craft is in normal flight, vertical gyroscope 22 detects any change in the pitch attitude of the craft from that desired, and bridge 23 is unbalanced. Motor control amplifier 24 causes operation of servomotor 25 to adjust the position of normally streamlined elevators 26 to restore the desired pitch attitude of the craft, and at the same time rebalances the bridge circuit, which is completed between terminals 20 and 21 by contacts 124 and 127 of relay 120.

Normal instrument landing procedure brings the craft into a porper heading to follow the localizer beam, the direction of which is the same as that of the glide path beam. The latter beam is normally entered from below, so that in watching cross pointer indicator 15 the human pilot observes the horizontal needle rise until it contacts the upper stop and then return to a central position, as the center of the glide path is approached. The voltage causing the displacement of the horizontal needle also appears between terminals 16 and 17, and is converted to a square wave by operation of vibrator 90, the alternating component of the square wave being impressed on the input to amplifier 32. Motor 40 accordingly runs at a speed determined by the voltage supplied from vibrator 90, a voltage from velocity generator 51 being added in the input to amplifier 32 so that the resulting output from the discriminator is suitable to maintain constant speed of the motor for constant input signal, as previously described. As the craft approaches the center of the glide path the signal from glide path receiver 10 decreases, and the speed of motor 40 concurrently decreases a proportional amount.

As the craft reaches the center of the glide path beam, the voltage impressed on input terminals 16 and 17 becomes zero, and motor 40 is stationary. The human pilot now actuates switch 143 into its "Glide" position, operating relay 120 and connecting motor 40 to slider 100 by means of the electromagnetic clutch 98.

Operation of relay 120 interrupts the normal bridge circuit and establishes a new input circuit for amplifier 24 which may be traced from the upper terminal of the amplifier through bridge 23, terminal 20, movable contact 124, fixed contact 126, the portion of winding 110 above slider 112, the slider, conductor 116, slider 115, and the portion of winding 113 below the slider.

If flight of the craft continues in the same horizontal direction, the craft moves into the space on the "high" side of the glide path. The horizontal pointer of indicator 15 moves downwardly from the central zero position, and an input voltage is impressed upon amplifier 32. Motor 40 is energized through discriminator 33, and it accelerates until the output from generator 51 has the above defined relation to the receiver signal: the speed of the motor is then proportional to the displacement of the craft from the beam. A voltage proportional to the speed of the motor, and hence to the receiver output, appears between slider 115 and ground.

As motor 40 operates, slider 100 is slowly displaced along winding 102 from its central position, and a voltage determined thereby appears between slider 112 and contact 126 of relay 120. This movement of slider 100 continues as long as motor 40 operates, the resulting voltage increasing when motor 40 runs in a first direction and decreasing when the motor runs in the opposite direction. Since the speed of the motor is proportional to the receiver signal, the voltage at slider 100 is proportional to the integral of the craft's displacement from the beam, and is hence a "reset" or "load compensation" signal, as will be discussed more fully below.

The previously traced input circuit to amplifier 24 now includes, in addition to any unbalance in bridge 23, the voltages determined by sliders 112 and 115: operation of servomotor 25 is initiated and elevators 26 are displaced from their streamlined position. Bridge 23 is unbalanced by operation of voltage divider 29 in a sense to oppose the voltages supplied through contact 126. The displacement of the elevators also initiates change in the pitch attitude of the craft, and in response thereto vertical gyroscope 22 also further unbalances bridge 23, through voltage divider 28, in the same sense as does operation of the elevators. Operation of motor 25 continues until the bridge unbalance voltage equals the signal voltage, when motor 25 is deenergized.

It will be appreciated that if the craft departs from the beam in the opposite direction, so that it is on the "low" side of the beam, operation of the apparatus as described above takes place in the opposite sense.

As the craft approaches the beam, by reason of being deflected from its normally level flight, the output from the receiver decreases. The speed of motor 40 is accordingly decreased by operation of amplifier 32 and discriminator 33, to reduce the velocity generator output and reestablish equilibrium between the radio and rebalance signals. The voltage on slider 115 is similarly reduced, the bridge unbalance now exceeds the signal, and operation of the elevators to raise the nose of the craft results. The craft accordingly follows a path slightly displaced from the beam, where the radio signal is in equilibrium with a vertical gyroscope signal resulting from a stable elevator displacement and a stable noselow attitude.

The reason for clutch 98, voltage divider 101, and secondary winding 103 is now apparent. The streamlined normal condition of the elevators is desirable for normal flight, but is not desirable for making landings, because it results in a normal condition of the craft which causes it to remain off the beam, in the high direction, rather than to follow the beam.

This can be corrected by supplying a continuously acting voltage of a sense to cause down-elevator operation of servomotor 25, and of such a magnitude that when the radio signal is zero the pitch attitude of the craft is one resulting in a normally gliding flight at the slope of the glide path rather than in normally level flight. This is accomplished as follows.

Motor 40 runs in one direction when the craft is above the glide path, and in the other direction when the craft is below the glide path. As the craft departs from the beam more widely in one direction or remains displaced in that direction longer than it does in the other direction, a net displacement of slider 100 results. This changes the voltage supplied by slider 112 in the circuit of amplifier 24, and establishes a new mean position for elevators 26 and a new pitch attitude for the craft as perceived by the vertical gyroscope: as a result of the new pitch attitude the craft proceeds along the beam rather than along a path displaced from it. The normal condition of the apparatus as a whole is thus reset from level flight to gliding flight, removing droop from the system and compensating for the load change resulting when the craft goes from level to gliding flight.

It will be apparent that the invention comprises means for causing a craft, normally stabilized for level flight, to follow an inclined glide path in a stable fashion. The structure includes a velocity generator for supplying to the output of the coupling unit a component varying with the magnitude of the displacement of the craft from the center of the beam, and this output is modified in accordance with the time integral of the displacement by means of voltage divider 101. The invention is not limited to control of the vertical movement of a craft, but is applicable to motor control systems generally where it is desirable to provide load compensation as well as simple proportioning control.

Numerous objects and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

I claim as my invention:

1. Control apparatus comprising, in combination: means normally stabilizing a craft about its pitch axis for level flight; a glide path receiver giving a response which varies in amount and sense in accordance with the amount and direction of the displacement of a craft from a selected glide path; means supplying outputs, for modifying the operation of said stabilizing means, which vary in accordance with the amount and sense of said response and with the time integral thereof; and means effective in a first condition to initiate said modified operation of said stabilizing means and in a second condition to restore said normal stabilization and simultaneously to reduce to zero said output varying in accordance with said time integral.

2. Control apparatus comprising, in combination: a motor; means driving said motor through a rotation determined by the amount and duration of the displacement of a craft from a selected glide path; craft control means having a condition of zero control effect and means resiliently maintaining it in said condition; and means releasably connecting said motor in driving relation to said control means, so that the condition thereof with respect to said zero condition is the time integral of the rotation of said motor during the interval since said connection was completed.

3. Apparatus for controlling an aircraft in accordance with its displacement from a selected path, so as to cause the craft to follow the path, comprising, in combination: signal means operable to supply a variable output in accordance with the amount and sense of the adjustment thereof; means for operating said signal means in accordance with the amount and duration of said displacement; and control means having an operated condition, in which said operating means is connected to said signal means so that the output of said signal means is thereafter a measure of the time integral of said displacement, and a normal condition in which said operating means is disconnected from said signal means; resilient means effective in the normal condition of said control means to bring said signal means into a condition of said zero output; and means controlling the craft in accordance with said output.

4. Control apparatus comprising, in combination: a motor; means energizing said motor for operation to an extent determined by the amount and duration of the displacement of a craft from a selected path; craft control means having a condition of zero control effect and means resiliently maintaining it in said condition; and means releasably connecting said motor in driving relation to said control means, so that the condition thereof with respect to said zero condition is the time integral of the operation of said motor during the interval since said connection was completed.

5. Apparatus of the class described comprising, in combination: a radio receiver giving a voltage which varies in magnitude and reverses in sense with variation in the amount and reversal in the direction of the displacement of an aircraft from a selected path; a motor; means connected to said motor and said receiver for causing operation of said motor at a speed and in a direction determined solely by said voltage; first output means driven by said motor to give a first output determined in sense and magnitude by the direction and speed of the operation of said motor; second output means driven by said motor from an initial point of zero output to give a second output which is the time integral of the operation of said motor; means normally stabilizing the aircraft about its pitch axis for level flight; and means modifying the operation of the last named means in accordance with said first and second outputs.

6. Apparatus of the class described comprising, in combination: a radio receiver giving a voltage which varies in magnitude and reverses in sense with variation in the amount and reversal in the direction of the displacement of an aircraft from a selected path; a motor; a generator driven by said motor to give a first output determined in sense and magnitude by the speed of said motor; means connected to said motor, said generator, and said receiver for causing operation of said motor at a speed and in a direction determined solely by the magnitude and polarity of said voltage; further means arranged for driven engagement with said motor to give a second output which varies from an initial zero value as the time integral of the operation of said motor; means normally stabilizing the aircraft about its pitch axis for level flight; and means modifying the operation of the named means in accordance with said first and second outputs.

7. Apparatus of the class described comprising, in combination: a radio receiver giving a first voltage which varies in magnitude and reverses in sense with variation in the amount and reversal in the direction of the displacement of an aicraft from a selected path; a motor; a generator driven by said motor to give a second voltage determined in sense and magnitude by the direction and speed of operation of said motor; a motor control amplifier energizing said motor for operation in a direction determined by the sense of the input supplied to said amplifier; means connecting only said first and second voltages as inputs to said amplifier, so that the speed of said motor is determined in sense and magnitude solely by the sense and magnitude of said first voltage; output means driven by said motor to give an output which varies from an initial zero value as the time integral of the operation of said motor; means normally stabilizing the aircraft about its pitch action for level flight; and means modifying the operation of said last named means in accordance with said second voltage and said output.

References Cited in the file of this patent

UNITED STATES PATENTS

| 2,372,185 | Wittkuhns | Mar. 27, 1945 |
| 2,429,642 | Newton | Oct. 28, 1947 |
| 2,482,809 | Thompson | Sept. 27, 1949 |
| 2,502,721 | Halpert | Apr. 4, 1950 |
| 2,513,537 | Williams | July 4, 1950 |
| 2,548,278 | Wirkler | Apr. 10, 1951 |
| 2,575,890 | Perkins et al. | Nov. 20, 1951 |
| 2,582,305 | Young | Jan. 15, 1952 |

(Other references on following page)

UNITED STATES PATENTS

| | | |
|---|---|---|
| 2,592,173 | Noxon et al. | Apr. 8, 1952 |
| 2,613,050 | Esval | Oct. 7, 1952 |
| 2,617,615 | Von Eschen | Nov. 11, 1952 |
| 2,622,231 | Gray | Dec. 16, 1952 |
| 2,627,057 | Rogers | Jan. 27, 1953 |
| 2,663,520 | Mosely | Dec. 22, 1953 |
| 2,670,454 | Wilson | Feb. 23, 1954 |

FOREIGN PATENTS

| | | |
|---|---|---|
| 516,567 | Great Britain | Jan. 5, 1940 |